(12) United States Patent
Hakka

(10) Patent No.: US 7,384,616 B2
(45) Date of Patent: Jun. 10, 2008

(54) WASTE GAS TREATMENT PROCESS INCLUDING REMOVAL OF MERCURY

(75) Inventor: Leo Ernest Hakka, Dollard des Ormeaux (CA)

(73) Assignee: Cansolv Technologies Inc., Montreal, Quebec (CA)

( * ) Notice: Subject to any disclaimer, the term of this patent is extended or adjusted under 35 U.S.C. 154(b) by 379 days.

(21) Appl. No.: 11/155,522

(22) Filed: Jun. 20, 2005

(65) Prior Publication Data

US 2006/0286017 A1 Dec. 21, 2006

(51) Int. Cl.
  B01D 53/50 (2006.01)
  B01D 53/56 (2006.01)
  B01D 53/62 (2006.01)
  B01D 53/64 (2006.01)

(52) U.S. Cl. .................. 423/210; 423/235; 423/242.1; 423/242.7; 423/220; 423/228

(58) Field of Classification Search ................ 423/210, 423/235, 242.1, 242.7, 220, 228
See application file for complete search history.

(56) References Cited

U.S. PATENT DOCUMENTS

| | | | |
|---|---|---|---|
| 4,440,731 A | 4/1984 | Pearce | |
| 5,019,361 A | 5/1991 | Hakka | |
| 5,262,139 A | 11/1993 | Hakka et al. | |
| 5,482,536 A | 1/1996 | Ngai et al. | |
| 6,638,485 B1* | 10/2003 | Iida et al. | 423/210 |
| 6,719,828 B1 | 4/2004 | Lovell et al. | |
| 6,790,420 B2 | 9/2004 | Breen et al. | |
| 7,052,662 B2* | 5/2006 | Duncan et al. | 423/235 |
| 2002/0174646 A1 | 11/2002 | Sanders | |
| 2002/0198097 A1* | 12/2002 | El-Shoubary et al. | 502/56 |
| 2003/0108466 A1* | 6/2003 | Alix et al. | 423/235 |
| 2003/0108472 A1* | 6/2003 | Duncan et al. | 423/335 |
| 2004/0105802 A1* | 6/2004 | Duncan et al. | 423/235 |
| 2004/0253159 A1 | 12/2004 | Hakka et al. | |
| 2005/0214187 A1* | 9/2005 | Johnson | 423/235 |

OTHER PUBLICATIONS

U.S. Appl. No. 10/902,134, filed Jul. 30, 2004, Hakka.
Zhao et al., Hg Absorption in Aqueous Permanganate, AIChE Journal, vol. 42, No. 12, Dec. 1996, pp. 3559-3562.

* cited by examiner

Primary Examiner—Timothy C. Vanoy
(74) Attorney, Agent, or Firm—Philip C. Medes da Costa; Bereskin & Parr

(57) ABSTRACT

A process for removing contaminants from a waste gas stream comprises treating the waste gas stream to remove at least one of $SO_2$ and $NO_x$ and to obtain a lean stream having a reduced level of at least one of $SO_2$ and $NO_x$ and, contacting the lean gas stream with a mercury absorbent solution comprising permanganate to remove mercury vapour and to obtain a mercury lean stream and a mercury rich absorbent solution. The mercury rich absorbent solution may be subsequently treated on a batch basis to remove precipitated manganese dioxide and obtain a solution containing mercury ions.

66 Claims, 3 Drawing Sheets

WASTE GAS TREATMENT PROCESS INCLUDING REMOVAL OF MERCURY

FIELD OF THE INVENTION

This invention relates to a process for the removal of mercury from one or more feed gas streams. In one particularly preferred embodiment, this invention relates to a process for the sequential treatment of one or more feed gas streams to remove gaseous pollutants therefrom and the regeneration of at least some of the liquid absorbents utilized to capture the gaseous pollutants from one or more feed gas streams.

BACKGROUND OF THE INVENTION

Many processes have been developed to capture gaseous pollutants, such as carbon dioxide, sulphur dioxide and nitrogen oxides ($NO_x$) from industrial process streams. One such method comprises the use of an absorbent to selectively absorb one or more gases from a feed gas stream. For example, U.S. Pat. Nos. 5,019,361 and 5,262,139, the disclosure of each of which is hereby incorporated by reference, each disclose an absorbent for recovering sulphur dioxide from a waste gas stream. Co-pending U.S. patent application Ser. No. 10/459,519, the disclosure of which is incorporated herein by reference, discloses an absorbent for absorbing carbon dioxide from a waste gas stream. Co-pending U.S. patent application Ser. No. 10/902,134, the disclosure of which is hereby incorporated herein by reference, discloses an absorbent for recovering $NO_x$ from a waste gas stream.

According to Zhao et al, *Hg Absorption in Aqueous Permanganate*, AIChE Journal, Vol. 42, No. 12, December 1996, pp 3559-3562, aqueous acidic permanganate has been known to be an effective solvent for elemental mercury vapour since 1956. Zhao et al discloses that aqueous acidic permanganate is also a suitable absorbent for NO. However, except for use the use of acidic permanganate impinger solutions to capture mercury vapor for analyzing gas samples, to the knowledge of the inventors, no commercial process has been developed that utilizes permanganate, Permanganate has been used in absorption processes as corrosion inhibitors. For example, U.S. Pat. No. 4,440,731 (Pearce) relates to corrosion inhibiting compositions for use in aqueous absorbent gas-liquid contacting process, and in particular, the removal of carbon dioxide from industrial combustion gasses using a solution containing an alkanol amine absorbent. The corrosion inhibiting compositions are used to reduce degradation of the absorbent under the conditions at which the absorbent was used and corrosion of the metals in contact with the absorbent solution during use. The corrosion inhibiting compositions comprise at least above 50 ppm of copper$^{+2}$ and at least from 50 parts per million parts of solution one or more of dihydroxyethylglycine, an alkali metal carbonate, an alkali metal or ammonium permanganate and nickel and/or bismuth oxides which are added to the absorbent solution.

Different processes have been developed for the removal of mercury from flue gasses. For example, U.S. Pat. No. 6,719,828 (Lovell et al) discloses the use of a phyllosilicate substrate, for example vermiculite or montmorillonite, which acts as an inexpensive support to a thin layer for a polyvalent metal sulfide. The sorbent is prepared by ion exchange between the silicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, to produce an exchanged substrate. Controlled addition of sulfide ions to the exchanged silicate substrate produces the sorbent. The sorbent is used to absorb elemental mercury or oxidized mercury species such as mercuric chloride from a flue gas that contains oxidizable gases (e.g., $SO_2$, NO, $NO_2$, and HCl).

U.S. Pat. No. 6,790,420 (Breen et al) discloses a process for the removal of mercury from combustion flue gasses using oxidation. As stated in the abstract of Breen et al, "ammonia and optionally carbon monoxide are injected into the flue gas in a manner so that there are sufficient amounts of these materials in the flue gas, when the flue gas is at a temperature of from 900° F. to 1350° F., to oxidize the metals within the flue gas. The oxidized metals are then attracted to particulates present in the flue gas. These particulates bound with oxidized metals are removed from the flue gas by a particulate removal device such as an electrostatic precipitator or baghouse".

United States Patent publication 2002-0174646 (Sanders) discloses a method for reducing NOx and/or $CO/CO_2$ emissions from the combustion of coal products or hydrocarbons. One or more curtains of particulate elemental iron, in the form of flakes or the like, are fanned across the combustion chamber and/or the exiting flue gas stream while it is still at high temperature. In a coal-fired furnace or boiler, particulate magnetite can be injected e.g. into a region just above the coal which will effectively sequester Hg and heavy metals at a location below a "rag layer" combustion zone in the vicinity of which iron is injected. Some iron may also adsorb mercury via "red iron" formation and be removed along with solid oxides, iron carbide and siderite via the ash chute of a boiler. Any particulates carried downstream in the flue gas stream are removed, prior to reaching the stack, by cyclones, scrubbers, precipitators or the like.

U.S. Pat. No. 5,482,536 (Ngai et al) relates to an apparatus for containing and scrubbing toxic or corrosive gases from a leaking pipe or cylinder utilizing a scrubbing media which, when it contacts the leaked gas, cleans or removes the harmful component, thus allowing release to the atmosphere of the cleaned air. In the case of a hydride gas, for example, arsine, germane, phosphine, hydrogen sulfide, hydrogen selenide, phosphine or organometallic mixtures, such as dimethyl zinc or diethyl telluride, the scrubbing media is preferably a high surface area carbon impregnated with oxides of copper or aluminum impregnated with potassium permanganate.

One disadvantage with the use of permanganate is that it is not regenerable once it has been used to capture mercury. Further, permanganate will absorb other oxidizable gases (i.e. NO or $SO_2$) in a combustion gas stream.

SUMMARY OF THE INVENTION

In accordance with the present invention, there is provided a process for the treatment of a gas stream containing mercury vapor and at least one other oxidizable gas comprising first treating the gas stream to reduce the level of the oxidizable gasses other than mercury below a predetermined level and subsequently using a mercury absorbent solution comprising permanganate to remove mercury from the gas stream. Preferably, the mercury absorbent solution comprises an alkali metal permanganate salt solution and, more preferably, the aqueous solution is acidic. Preferably, the gas stream comprises less than 100 ppm of oxidizable gasses other than mercury, more preferably less than 50 ppm, and most preferably less than 25 ppm, when the gas stream contacts the mercury absorbent solution. Accordingly, the permanganate, which is non-regenerable, is chiefly used to oxidize the mercury vapor and not to react with the other oxidizable gasses present in the initial feed gas stream.

In accordance with one aspect of the instant invention, there is provided a process for removing contaminants from a waste gas stream comprising:
(a) treating the waste gas stream to remove at least one of $SO_2$ and $NO_x$ and to obtain a lean stream having a reduced level of at least one of $SO_2$ and $NO_x$; and,
(b) contacting the lean gas stream with a mercury absorbent solution comprising permanganate to remove mercury vapor and to obtain a mercury lean stream and a mercury rich absorbent solution.

In one embodiment, the process further comprises selecting an aqueous alkali metal or alkaline earth metal permanganate solution as the mercury absorbent solution.

In another embodiment, the process further comprises selecting an aqueous alkali metal as the mercury absorbent solution.

In another embodiment, the process further comprises selecting as the mercury absorbent solution a solution comprising at least one of a potassium salt of permanganate, a sodium salt of permanganate, a magnesium salt of permanganate and a calcium salt of permanganate.

In another embodiment, the mercury absorbent solution is acidic.

In another embodiment, the mercury absorbent solution comprises an aqueous alkali metal permanganate solution having a pH less than about 1.

In another embodiment, the aqueous alkali metal permanganate solution comprises about 0.1 to 5% by weight permanganate salt.

In another embodiment, the process further comprises treating the waste gas stream to remove $SO_2$ and $NO_x$ and to obtain a lean stream having a reduced level of $SO_2$ and $NO_x$.

In another embodiment, the process further comprises treating the waste gas stream to remove $SO_2$ and to subsequently remove $NO_x$ and to obtain a lean stream having a reduced level of $SO_2$ and $NO_x$.

In another embodiment, the process further comprises treating the waste gas stream to remove $SO_2$, $CO_2$ and $NO_x$ and to obtain a lean stream having a reduced level of $SO_2$, $CO_2$ and $NO_x$.

In another embodiment, the process further comprises:
(a) subjecting the waste gas stream to a $SO_2$ removal step using a regenerated $SO_2$ absorbent stream and recovering a $SO_2$ lean stream and a $SO_2$ rich absorbent stream;
(b) treating the $SO_2$ rich absorbent stream to obtain the regenerated $SO_2$ absorbent stream and a first gaseous stream;
(c) subjecting the $SO_2$ lean stream to a $NO_x$ removal step using a regenerated $NO_x$ absorbent stream and recovering the lean stream and a $NO_x$ rich absorbent stream; and,
(d) treating the $NO_x$ rich absorbent stream to obtain the regenerated $NO_x$ absorbent stream and a second gaseous stream.

In another embodiment, the process further comprises:
(a) subjecting the waste gas stream to a $SO_2$ removal step using a regenerated $SO_2$ absorbent stream and recovering a $SO_2$ lean stream and a $SO_2$ rich absorbent stream;
(b) treating the $SO_2$ rich absorbent stream to obtain the regenerated $SO_2$ absorbent stream and a first gaseous stream;
(c) subjecting the $SO_2$ lean stream to a $CO_2$ removal step using a regenerated $CO_2$ absorbent and recovering a $CO_2$ lean stream and a $CO_2$ rich absorbent stream;
(d) treating the $CO_2$ absorbent to obtain the regenerated $CO_2$ absorbent stream and a third gaseous stream;
(e) subjecting the $CO_2$ lean stream to a $NO_x$ removal step using a regenerated $NO_x$ absorbent stream and recovering the lean stream and a $NO_x$ rich absorbent stream; and,
(f) treating the $NO_x$ rich absorbent stream to obtain the regenerated $NO_x$ absorbent stream and a second gaseous stream.

In another embodiment, the lean stream comprises less than 100 ppm $SO_2$ and $NO_x$.

In another embodiment, the lean stream comprises less than 50 ppm $SO_2$ and $NO_x$.

In another embodiment, at least some of the permanganate reacts upon expose to mercury vapor to produce manganese dioxide and the process further comprises treating the mercury rich absorbent stream to remove precipitated manganese dioxide.

In another embodiment, the mercury rich absorbent stream is treated to remove precipitated manganese dioxide on a batch basis.

In another embodiment, the mercury absorption solution is acidic and contains $Hg^{++}$ ions and $Mn^{++}$ ions and the process further comprises treating the mercury rich absorption solution to precipitate manganese dioxide.

In another embodiment, the process further comprises treating the mercury rich absorption solution with permanganate to precipitate manganese dioxide In another embodiment, the mercury rich absorbent stream is treated to remove precipitated manganese dioxide on a batch basis.

In another embodiment, the process further comprises subsequently removing the dissolved $Hg^{++}$ by one or more of selective ion exchange and precipitation.

In another embodiment, the $Hg^{++}$ is precipitated by the addition of a precipitation agent comprising one or more of sulfide and trimercapto-s-triazine trisodium salt.

In another embodiment, the process further comprises monitoring the concentration of permanganate in the mercury absorbent solution and adding alkali metal permanganate to maintain the concentration of permanganate in the mercury absorbent solution in the range 0.01 to 5% wt.

In another embodiment, the mercury rich absorbent solution is neutralized to a pH>4 and sufficient permanganate is added to oxidize manganese in the +2 oxidation state to the +4 oxidation state whereby essentially all the manganese salts precipitate as $MnO_4$.

In another embodiment, the process further comprises treating the mercury rich absorbent solution having precipitate therein to separate the precipitate and subsequently treating the mercury rich absorbent solution to remove dissolved $Hg^{++}$.

In another embodiment, the mercury rich absorption solution contains $Hg^{++}$ ions and precipitated manganese dioxide and the process further comprises separating the precipitates manganese dioxide and obtaining a liquid stream. Preferably, in this embodiment, the process further comprises subsequently removing the dissolved $Hg^{++}$ from the liquid stream by one or more of selective ion exchange and precipitation. Preferably the $Hg^{++}$ is precipitated by the addition of a precipitation agent comprising one or more of sulfide and trimercapto-s-triazine trisodium salt.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

Figure 1:
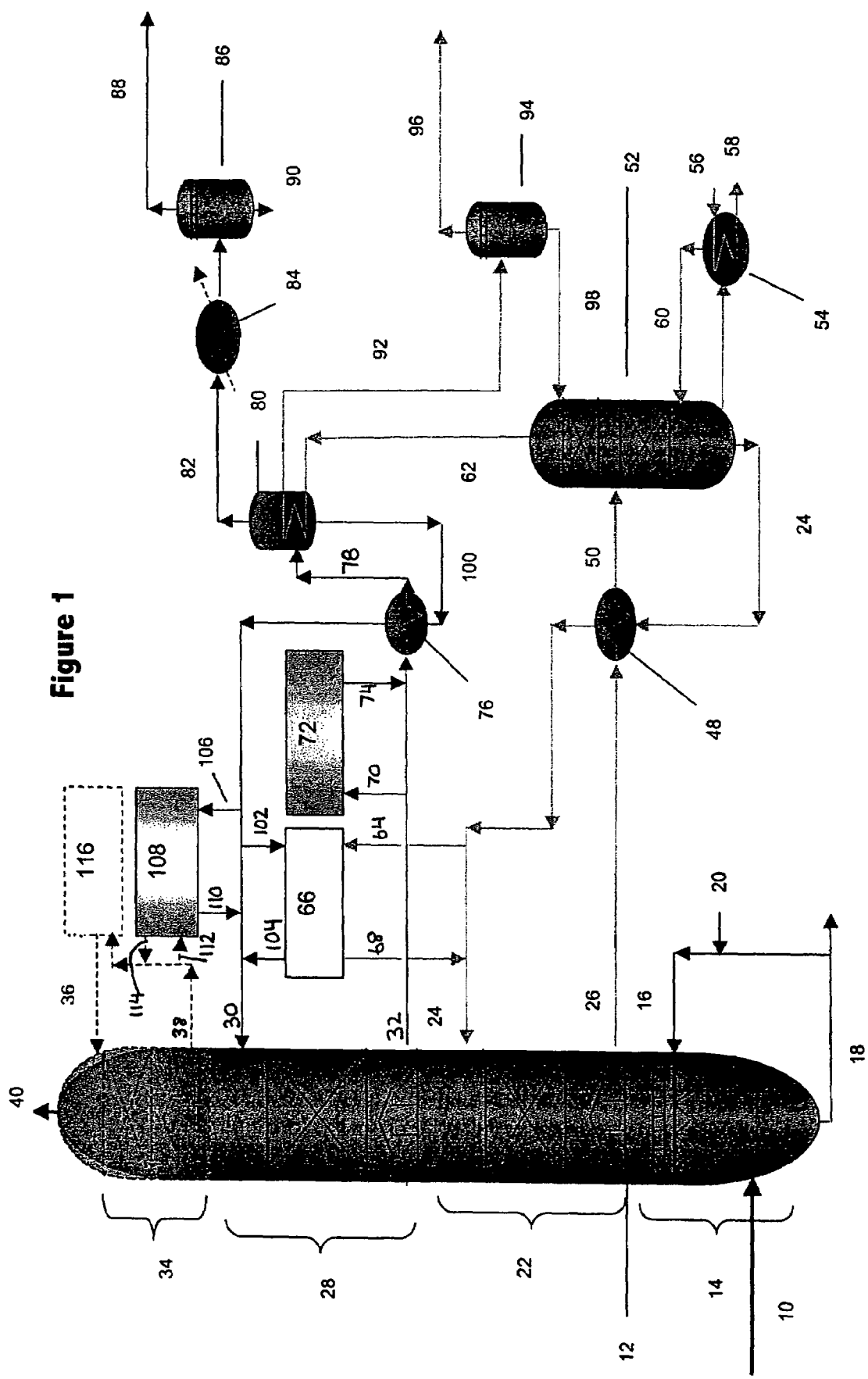
FIG. 1 is a schematic drawing of a process to capture sulphur dioxide, $NO_x$ and mercury vapor from a feed gas stream and to regenerate the sulphur dioxide absorbent and the $NO_x$ absorbent.
Figure 2:
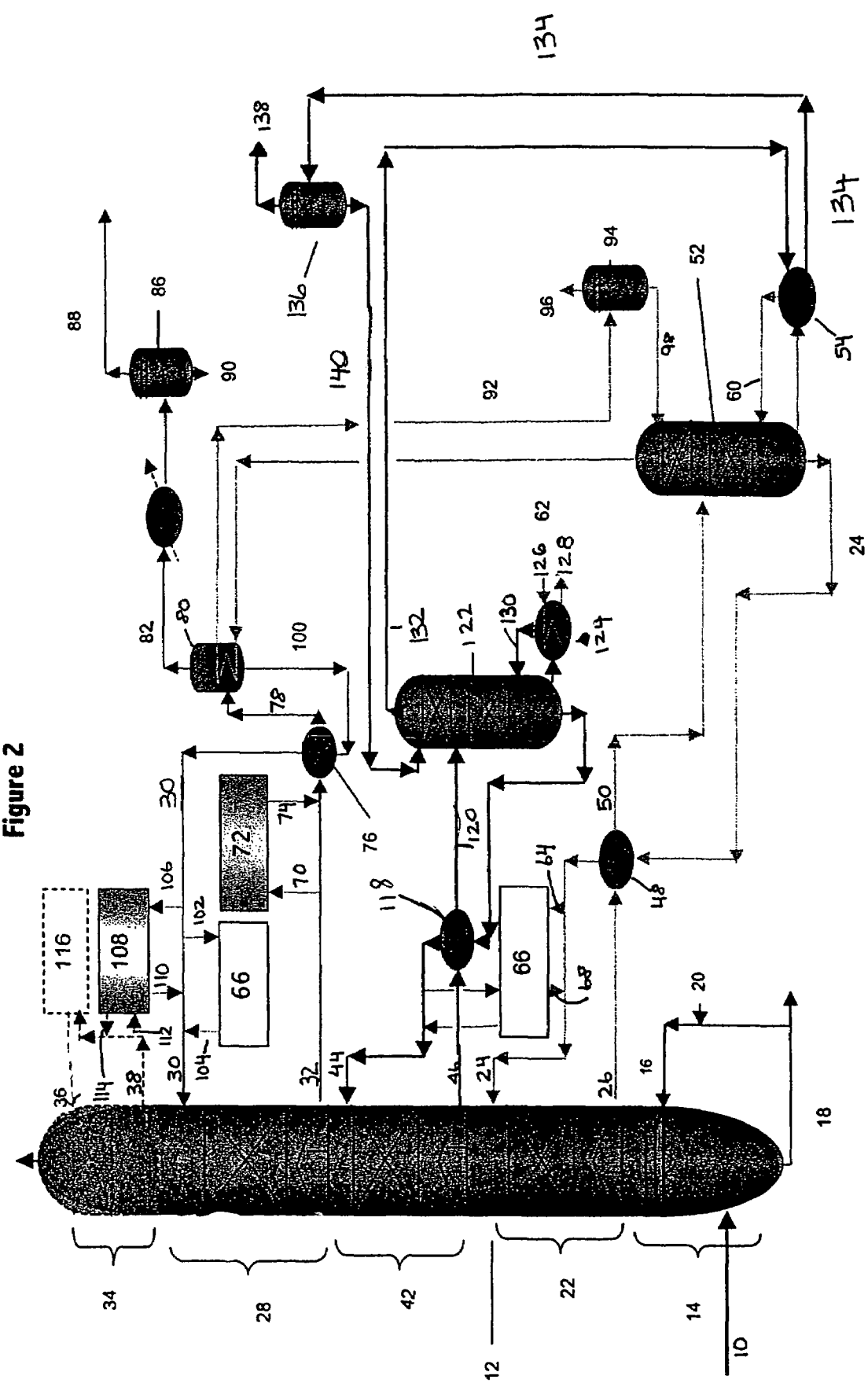
FIG. 2 is a schematic drawing of a process to capture sulphur dioxide, carbon dioxide $NO_x$ and mercury vapor from the feed gas stream and to separately regenerate the sulphur dioxide, the carbon dioxide and the $NO_x$ absorbents; and, FIG. 3 is a schematic drawing of a process for treating a spent aqueous alkali metal permanganate absorbent solution.

In accordance with the instant invention, a feed gas stream is treated to sequentially reduce the concentration of oxidizable gasses other than mercury vapor, e.g., $SO_2$ and/or $NO_x$, to below a predetermined level and to then subsequently treat the feed gas stream to remove mercury vapor therefrom using permanganate. Preferably, as shown in FIGS. 1 and 2, the feed gas is treated to reduce the concentration of oxidizable gasses other than mercury vapor therein using absorbents, and preferably, regenerable absorbents. For example, referring to FIG. 1, feed gas stream 10 contains two oxidizable gasses other than mercury vapor namely sulphur dioxide and $NO_x$, as well as mercury vapor. Feed gas stream 10 may be contacted with different absorbents to selectively absorb sulphur dioxide and $NO_x$ from feed gas stream 10 and subsequently the treated feed gas stream may be contacted with a third absorbent to absorb mercury vapor therefrom.

It will be appreciated that the feed gas stream may contain only one or a plurality of oxidizable gasses other than mercury vapor and that feed gas stream 10 may be sequentially treated in different stages to reduce the concentration of each oxidizable gas other than mercury vapor to below a predetermined level. Alternately, two or more oxidizable gasses may be removed in one treatment stage.

The feed gas may be any gas stream that contains at least one oxidizable gas as well as mercury vapor. Preferably the feed gas stream contains at least one of $SO_2$ and $NO_x$, more preferably contains at least $SO_2$ and $NO_x$. The feed gas may also contain $CO_2$ and may be an industrial waste gas such as that resulting from roasting of ore or gas from the combustion of an organic combustible fuel such as coal, fuel oil or petroleum coke.

It will also be appreciated that a single absorption column 12 may be utilized to sequentially expose feed gas stream 10 to a plurality of absorbents, each of which is selected to absorb particular pollutants from the feed gas stream. Alternately, a plurality of absorption columns or other contact vessels may be connected in series.

The feed gas stream when subjected to the mercury removal stage has a concentration of oxidizable gasses that has been reduced below a predetermined limit. The limit may be determined by local pollution control regulations. For example, local regulations may set an emission level for $SO_2$ and another emission level for $NO_x$. The degree to which permanganate will react with different gasses depends on various factors including the relative concentration of the gasses and their relative mass transfer rates. Preferably, prior to contacting the mercury absorbent solution, the concentration of oxidizable gasses in the feed gas has been reduced such that the feed gas comprises less than 100 ppm oxidizable gasses other than mercury vapor, more preferably less than 50 ppm and, most preferably, less than 25 ppm. In one particular embodiment, the main pollutants in a feed gas stream, other than mercury vapor, are $SO_2$ and $NO_x$. In this embodiment, prior to contacting the mercury absorbent solution, the concentration of $SO_2$ and $NO_x$ in the feed gas is preferably less than 100 ppm, more preferably less than 50 ppm, and most preferably less than 25 ppm.

In the preferred embodiment of FIG. 1, feed gas 10 contains both $SO_2$ and $NO_x$. Accordingly, feed gas stream 10 is introduced at the bottom of absorption column 12 and is preferably first passed through pre-treatment stage 14 wherein the feed gas flows counter-current to water stream 16 to remove particulate matter from feed gas stream 10 and to quench it, preferably, to about its adiabatic saturation temperature. This water pre-treatment may also remove other contaminants from the feed gas, e.g. hydrochloric acid and sulfuric acid. The resultant pre-scrubber blowdown water stream 18 may be re-cycled, with make up water from feed stream 20 as required, and a portion of the blowdown water stream 18 may be treated to remove particulate matter therefrom.

After passing through optional pre-treatment stage 14, the pre-treated feed gas stream may then be passed through a first absorption zone 22 in column 12, which may be a sulphur dioxide absorption zone. An absorbent, preferably a regenerated absorbent, may be introduced via stream 24 into absorption column 12 where it flows counter-current to the pre-treated feed gas stream so as to produce pregnant absorbent stream 26 and a further treated feed gas stream. The further treated feed gas stream may then be introduced to a second absorption zone 28, which may be a $NO_x$ absorption zone, wherein the feed gas counter-currently contacts a second absorbent, preferably a regenerated absorbent stream 30, to produce a second pregnant absorbent stream 32. For example, second regenerated absorbent stream 30 may be selected to absorb $NO_x$ and optionally some mercury from the feed gas stream.

Mercury absorption zone 34 is positioned downstream from second absorption zone 28. In mercury absorption zone 34, the treated feed gas is contacted with mercury absorbent 36 to oxidize the mercury and render it soluble in mercury absorbent 36 thereby producing mercury enriched absorbent solution 38. Mercury absorbent 36 will also tend to oxidize and remove additional traces of sulphur dioxide, $NO_x$ thereby also polishing the feed gas. The treated feed gas may then exit absorption column 12 via stream 40. Treated feed gas stream 40 may be released to the atmosphere, transported to additional equipment for further treating or recycled within a process. The concentration of mercury vapor in treated feed gas stream 40 may be less than 5 $\mu g/m^3$, preferably less than 3 $\mu g/m^3$, more preferably less than 2 $\mu g/m^3$ and most preferably less than 1 $\mu g/m^3$.

In the alternate embodiment of FIG. 2, absorption column 12 includes a third absorption zone 42 in which the feed gas is exposed to a further regenerated absorbent stream 44 to produce a further pregnant absorbent stream 46. For example, first absorption zone 22 may be designed to absorb sulphur dioxide from the feed gas stream. Second absorption zone 42 may be designed to remove carbon dioxide from the feed gas stream. Finally, the third absorption zone 28 may be designed to remove $NO_x$ and optionally some mercury from the feed gas stream. It will be appreciated that the oxidizable gasses may be selectively removed from the feed gas in any desired order. For example, the carbon dioxide absorption zone may be upstream or downstream from the sulphur dioxide and $NO_x$ absorption zones. However, since $SO_2$ tends to be absorbed in absorbents for other gasses, it is preferable to absorb $SO_2$ before other impurity gases. Accordingly, when an absorbent stream is regenerated, the impurity (oxidizable gas) that is absorbed in the absorbent solution is simpler to isolate. Alternately, if $SO_2$ is not absorbed before other impurity gases the regeneration of the absorbent will result in imperfect separation of the various contaminant gases.

It will be appreciated by those skilled in the art that column 12 may comprise a plurality of zones 22, 28 and 42 each of which is designed to absorb one or more pollutants from a single feed gas stream. It will also be appreciated by those skilled in the art that pregnant absorbent streams 26, 32 and 46 may be obtained from different absorption columns each of which treats a different feed gas.

It will also be appreciated by those skilled in the art that the absorbent, which is utilized in each stage, may be any of those known in the art. For example, the absorbent used to absorb sulphur dioxide may be an amine absorbent such as those disclosed in U.S. Pat. Nos. 5,019,361 and 5,262,139. The absorbent used to absorb carbon dioxide may be any of these disclosed in U.S. patent application Ser. No. 10/459, 519.

The absorbent used to absorb $NO_x$ may be an iron amine carboxylic acid chelate, and, preferably, an iron amine polycarboxylic acid chelate dissolved in water. Preferably, the iron chelate is an iron N-(2-hydroxyethyl)ethylenediaminetriacetate sodium salt and, more preferably, iron ethylenediaminetetraacetate disodium salt. Preferably, the concentration of the iron chelate is 0.05 to 0.5 M, more preferably 0.1 to 0.4 M and, most preferably 0.1 to 0.3M.

The carbon dioxide absorbent amines may be primary, secondary or tertiary with $pK_a$'s in the range 6.0-10, preferably 6.5-10 and, more preferably 6.5-9.5. To prevent loss of the amine with the treated gas, the preferred amines preferably have a vapor pressure less than 1 mm Hg at 50° C. over the absorbent. Preferred amines include 4-(2-hydroxyethyl)-1-piperazineethanesulfonic acid ($pK_a$=7.5), morpholinoethanesulfonic acid ($pK_a$=6.1), N-(2-hydroxyethyl)ethylenediamine ($pK_a$ 1=9.5, $pK_a$ 2=6.5), piperazine ($pK_a$ 1=9.8, $pK_a$ 2=5.6), N-(2-hydroxyethyl)piperazine ($pK_a$ 1=9.0, $pK_a$ 2=4.5), benzimidazole ($pK_a$ 5.5), and N,N'-bis(2-hydroxyethyl)piperazine ($pK_a$ 1=7.8, $pK_a$ 2=3.9) and mixtures thereof.

If present, 4-(hydroxyethyl)piperazineethanesulfonic acid will be in salt form during the absorption process. Preferably, it is present as either a sodium or potassium salt rather than an amine salt. The sulfonic acid is a strong acid and will ionize at a pH greater than about −3 and is preferably neutralized (e.g. with NaOH) for the process solvent to attain or remain at the desired operating pH.

The pH of the sulphur dioxide absorbent during the absorption step is preferably 4 to 6, more preferably 4.5 to 6 and, most preferably, from 5 to 6. The pH of the absorbent when it is introduced to the gas stream that is to be treated is preferably in this range. The N-(2-hydroxyethyl)ethylenediamine (HEED), N-(2-hydroxyethyl)piperazine (HEP), N,N'-bis(2-hydroxyethyl)piperazine (DIHEP) and piperazine are diamines and the stronger amine function (i.e., the amine with a pKa of, e.g., 9.0 or 7.8) will be in protonated form associated with the anion of a strong acid such as sulfate or sulfite at the operating pH of the process.

The carbon dioxide absorbent preferably also includes an oxygen scavenger such as sulfite and/or a bisulfite. The sulfite and/or bisulfite may be present in an amount of from 0.05 to 5, preferably 0.1 to 3 and, more preferably 0.05-1 wt. % based upon the weight of the absorbent.

Referring to FIG. 1, pregnant absorbent stream 26 may be regenerated by subjecting the pregnant absorbent to a steam-stripping step. Pregnant absorbent stream 26 and regenerated absorbent stream 24 may be passed through an indirect heat exchanger 48 to produce heated pregnant absorbent stream 50 that is introduced into a first steam-stripping column 52.

The absorbed pollutant is removed from pregnant solution 50 by heating solution 50 so as to liberate the absorbed pollutant. Preferably, a steam stripping column is utilized wherein steam provides the required heat to liberate the absorbed pollutant from the absorbent.

Steam stripping column 52 may be of either a packed or tray design. Heated pregnant solution 50 is introduced at an upper portion of column 52 to flow downwardly through column 52 into a reboiler 54. The reboiler is heated by any means known in the art. Preferably, reboiler 54 is indirectly heated by stream 56 (which may be steam and may be obtained from any source) through e.g., a heat transfer tube bundle, producing a steam condensate stream 58 which may be recycled to produce additional steam or used elsewhere in a plant. The boiling of the absorbent in re-boiler 54 produces a flow of steam 60 into column 52. The steam ascends upwardly through the column, heating the downward flow of pregnant absorbent 50 and carrying upwards the gaseous pollutant that is evolved from the absorbent. The steam and pollutant (in this case sulphur dioxide) exits column 52 as stream 62. Regenerated absorbent collects in the bottom of column 52 and is removed from column 52 as regenerated absorbent stream 24.

Heat stable salts may build up in the regenerated absorbent. Accordingly, the regenerated absorbent may be treated to remove the heat stable salts as is known in the art. For example, a bleed stream 64 may be taken from regenerated absorbent stream 24 and treated in a salt removal unit 66 to produce a treated bleed stream 68 that has a reduced concentration of heat stable salts.

A bleed stream 70 may be taken from pregnant solution stream 32 obtained from second absorption zone 28 and fed to an electrolysis unit 72 to reduce ferric chelate, which is produced by the oxygen oxidation of ferrous chelate, back to ferrous chelate, since only the latter is active for absorbing nitric oxide. The electrolysis unit 72 may alternatively operate on heated regenerated absorbent stream 30 (not shown). The treated bleed stream 74 may then be returned to stream 32. As regenerated absorbent 100 is at an elevated temperature, regenerated absorbent 100 may be used to indirectly heat pregnant solution 32 by passing both streams through indirect heat exchanger 76 to produce heated pregnant solution stream 78.

In the embodiment shown in FIG. 1, absorption zone 28 is used to absorb $NO_x$ and, preferably, also some mercury. Pregnant solution stream 78 may accordingly be fed to flash tank 80 which is preferably heated by stream 62 to produce an off gas stream 82 containing $NO_x$ and water. Off gas stream 82 may be passed through a condenser 84 to gas liquid separator 86 to produce a gaseous stream 88, which may comprise 99% or higher $NO_x$ on a dry basis, and a waste water stream 90. Stream 90 could alternately be returned to flash tank 80 as reflux.

As product stream 62 indirectly heats tank 80, such as by passing product stream 62 through a heating tube bundle in tank 80, stream 62 is cooled to produce cooled product stream 92 which may be provided to a gas liquid separator 94 to produce gaseous product stream 96, which may contain 99% or higher, and preferably 99.9% pure $SO_2$ on a dry basis, and return liquid stream 98 comprising water and absorbent. The return liquid stream 98 may be introduced into column 52 to provide a closed loop system.

If required, a condenser may be provided between flash tank 80 and gas liquid separator 94 so as to condense more of the liquid in cooled product stream 92 to thereby further dry product stream 96.

Sulphur dioxide will evolve from pregnant solution 50 when pregnant solution 50 is heated to a sufficiently high temperature. In particular, if reboiler 54 is operated at a temperature of about 95-120° C., the steam produced by reboiler 54 will cause sulphur dioxide to evolve from the absorbent and will produce a product stream 62 that is at a temperature higher than the temperature required to regenerate the $NO_x$ absorbent. Accordingly, product stream 62 may be used to provide heat to flash tank 80. In some conditions, additional heating may be provided from an external source. Alternately, or in addition, flash tank 80 may be operated at a reduced pressure. For example, flash tank 80 may be operated at a temperate of about 80 to 105° C. and, preferably, at a pressure of about 350-900 mm Hg. Accordingly, the heat introduced by stream 56 into reboiler 54 may be utilized to power both the regeneration of the sulphur dioxide absorbent as well as the regeneration of the $NO_x$ absorbent.

As the absorbent in flash tank 80 is heated, pollutant gases are evolved resulting in a decrease of the concentration of pollutant gases in the absorbent in flash tank 80, thereby regenerating the absorbent. The regenerated absorbent exits flash tank 80 via stream 100. After passing through indirect heat exchanger 76, at least a bleed stream 102 may be taken from regenerated absorbent stream 30 and fed to salt removal unit 66 to remove heat stable salts which build up in the absorbent. The treated bleed stream is returned to regenerated absorbent stream 30 via stream 104. The process for removal of salts from stream 102 may be different than the salt removal process applied to stream 64.

Depending upon the absorbent used, regenerated absorbent stream 30 may absorb $NO_x$ as well as mercury. In such a case, mercury will be present in the regenerated absorbent 100. Accordingly, at least a bleed stream 106 may be withdrawn from regenerated absorbent stream 100 and treated to remove mercury therefrom. For example at least a bleed stream 106 may be fed to mercury removal unit 108 to remove mercury from the bleed stream and produce treated bleed stream 110 that has a reduced level of mercury therein.

Mercury is removed from a treated feed gas stream by contacting a feed gas stream that has an acceptable level of oxidizable gasses other than mercury with a mercury absorbent solution and then treating the mercury absorbent solution to remove mercury therefrom in mercury removal unit 108. The mercury absorbent zone may be part of column 12 or may be a separate piece of equipment.

In the embodiment of FIG. 1, column 12 has zone 34, which is a mercury absorption zone, that uses a mercury absorbent 36, such as an aqueous solution of alkali metal permanganate, preferably potassium permanganate ($KMnO_4$). The absorbent travels counter currently to the feed gas stream and produces a pregnant mercury enriched solution 38 comprising mercury as well as reduced manganese species, such as manganese dioxide ($MnO_2$) or manganous ions ($Mn^{++}$). Some or all of pregnant solution 38, e.g., at least a bleed stream 112 of pregnant solution 38, is treated in mercury removal unit 108 to remove mercury from pregnant absorbent stream 38. The treated bleed stream is returned to the pregnant absorption stream 38 via return stream 114. The treated absorbent containing a reduced level of mercury is recycled via stream 36 to column 12.

Any one of salt removal unit 66, mercury removal unit 108 or permanganate addition unit 116 may be operated either continuously or in batch mode. In particular, mercury removal unit 108 may be operated on a batch basis once the level of permanganate is absorbent 36 has been reduced to a predetermined level. From time to time, additional permanganate may be added to absorbent stream 38 via permanganate addition unit 116.

The mercury absorbent solution comprises a permanganate solution. Preferably, the mercury absorbent solution comprises an aqueous permanganate solution. The mercury absorbent solution may comprise any water soluble permanganate salt. For example, the permanganate salt may be an alkali metal or an alkaline earth metal permanganate salt. Preferably, the mercury absorbent solution comprises an alkali metal permanganate salt solution. Preferably the alkali metal comprises potassium, sodium, magnesium, calcium and mixtures thereof and, more preferably, potassium.

The solution preferably comprises a sufficient amount of permanganate to oxidize mercury vapor, $Hg^0$. The mercury absorbent solution preferably comprises from 0.01-5 wt % alkali metal permanganate salt, more preferably from 0.1-5 wt % alkali metal permanganate salt and most preferably from 1-4 wt % alkali metal permanganate salt.

The permanganate solution may be either neutral or alkaline, or it may be acidic. For example, if the permanganate solution is neutral or alkaline, then the permanganate solution may have a pH from 6-14, preferably 8-14 and most preferably 10-14. If the absorbent solution is neutral or alkaline, then three units of oxidation are obtained per manganese atom, according to the equation below where A represents an alkali metal cation:

$$2AMnO_4+3Hg^0+H_2O \Rightarrow 3HgO+2MnO_2\downarrow+2AOH$$

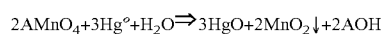

The manganese dioxide produced is insoluble and precipitates. This may be advantageous for reconstituting spent solutions but could cause difficulties by depositing on and plugging up equipment. However, the alkaline pH of the solution is beneficial if any $NO_2$ or $N_2O_3$ is present in the feed gas or is formed by oxidation, since these species will dissolve and be retained in solution as nitrite or nitrate salts, reducing $NO_x$ emissions.

If the permanganate solution is acidic, then the permanganate solution preferably has a pH from 0-1 since strongly acidic solutions are required to permit the permanganate to go to the +2 manganous oxidation state. At such levels of acidity, pH is a less reliable measure of acidity. Thus the acidity may be expressed as that which would be produced by a solution comprising 1-20% wt. sulfuric acid. The permanganate in acidic solution, such as 1M $H_2SO_4$ (pH about 0) for example, is capable of doing 5 units of oxidation according to the equation below where A represents an alkali metal cation:

$$2AMnO_4+5Hg^0+8H_2SO_4 \Rightarrow 2MnSO_4+5HgSO_4+ \\ A_2SO_4+8H_2O$$

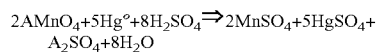

No solids are formed in this reaction. Accordingly, it is preferred to use an acidic permanganate solution.

In FIG. 2, an alternate embodiment is shown in which the feed gas is sequentially passed through three absorption zones to first remove sulphur dioxide (absorption zone 22), to subsequently remove carbon dioxide (absorption zone 42) and to then remove NO$_x$ and possibly some mercury, depending upon the absorbent that is used (absorption zone 28). Accordingly, the main difference between FIGS. 1 and 2 is the addition of absorption zone 42 and the regeneration of the absorbent utilized in the carbon dioxide absorption zone. Accordingly, where applicable, the same reference numerals have been used to denote the same equipment and streams as utilized in FIG. 1. The order of absorption zones may also be changed so that sulphur dioxide is absorbed first, NO$_x$ next and carbon dioxide last.

As shown in FIG. 2, pregnant solution 46 may also be fed to an indirect heat exchanger 118 to produce cooled regenerated absorbent stream 44 and to produce heated pregnant absorbent stream 120 that is preferably fed into stripping column 122. Second stripping column 122 is heated by second reboiler 124. Second reboiler 124 may be heated by any means known in the art. Preferably, second reboiler 124 is indirectly heated by stream 126 (which may be steam and may be obtained from any source) through e.g., a heat transfer tube bundle, producing a steam stream 130 and condensate stream 128 which may be recycled to produce additional steam or used elsewhere in a plant. The boiling of the absorbent in second reboiler 124 produces a flow of steam 130. Steam 130 causes carbon dioxide to be released from the absorbent as the steam and absorbent pass countercurrently through column 122 thereby producing product stream 132 which contains carbon dioxide and steam.

Stripping column 122 may be operated at a higher temperature than the first stripping column 52. For example, second reboiler 124 is preferably operated at a temperature of 120-140° C. At such temperatures, the carbon dioxide absorbed in pregnant solution 120 will be liberated and, in addition, product stream 132 will be at a sufficiently elevated temperature so as to be able to operate first reboiler 54 at a temperature of 95-120° C. Accordingly, product stream 132 may be fed to first reboiler 54. Cooled product stream 134 may then be fed to a gas liquid separator 136 to produce a product carbon dioxide stream 138 which may comprise 99 wt % or more carbon dioxide on a dry basis, and a recycle stream 140 containing water and absorbent. If required, a condenser may be provided between first reboiler 54 and gas liquid separator 136 to remove additional water vapor from cooled product stream 134 thereby further drying carbon dioxide product stream 138. Accordingly, in the embodiment of FIG. 2, the regeneration of three absorbents is heat integrated thereby resulting in a substantial reduction of energy costs to regenerate each of the absorbents.

Without restricting the generality of the foregoing, stream 132 may be used to indirectly heat reboilers 54 and 80, with the cooled streams from both being joined to form a stream equivalent to stream 134 for phase separation in gas liquid separator 136.

Absorbent solution 38 for the capture of HgO will gradually be depleted of its permanganate through consumption in oxidation reactions and mercury will accumulate in the solution. To preserve the effectiveness of the solution to absorb Hg°, absorbent solution may be replaced with fresh absorbent solution. For example, in the flow loop from the exit from column 12 to the entrance to column 12, some or all of the enriched absorbent 38 may be withdrawn and fresh absorbent solution may be added to the absorbent that remains in the flow loop to produce absorbent solution 36. Such additional permanganate may be added to the absorbent solution continuously or periodically. Alternately, or in addition, periodically, all or essentially all of the enriched absorbent 38 may be withdrawn from the flow loop and fresh absorbent added to the flow loop. Preferably, the absorbent solution is rehabilitated periodically, i.e. on a batch basis.

If the absorbent solution is alkaline, then insoluble manganese dioxide will be produced. In such a case, the manganese dioxide is preferably removed by continuous filtration of the circulating solvent 38. For example, some or all of enriched absorbent solution 38 may be filtered as the absorbent solution is circulated to its entry point to column 12. This filtration may occur periodically or continuously as the absorbent is circulated.

Other oxidizable components of the feed gas will also react with the permanganate, forming anions such as nitrite and nitrate from NO and sulfate from SO$_2$. These anions will form alkali salts with the alkali of the solvent 38. These salts may be removed as the absorbent is circulated or, as long as they do not precipitate out, they may be retained in the absorbent until the absorbent is treated to remove mercury therefrom in mercury removal unit 108.

Preferably, when essentially all of the permanganate has been consumed, the enriched absorbent is delivered on a batch basis to mercury removal unit 108 wherein the mercury salts dissolved in enriched absorbent 38 are preferably removed by precipitation with known agents such as sulfide or trimercapto-s-triazine or by extraction with a mercury selective ion exchange resin.

Figure 3:
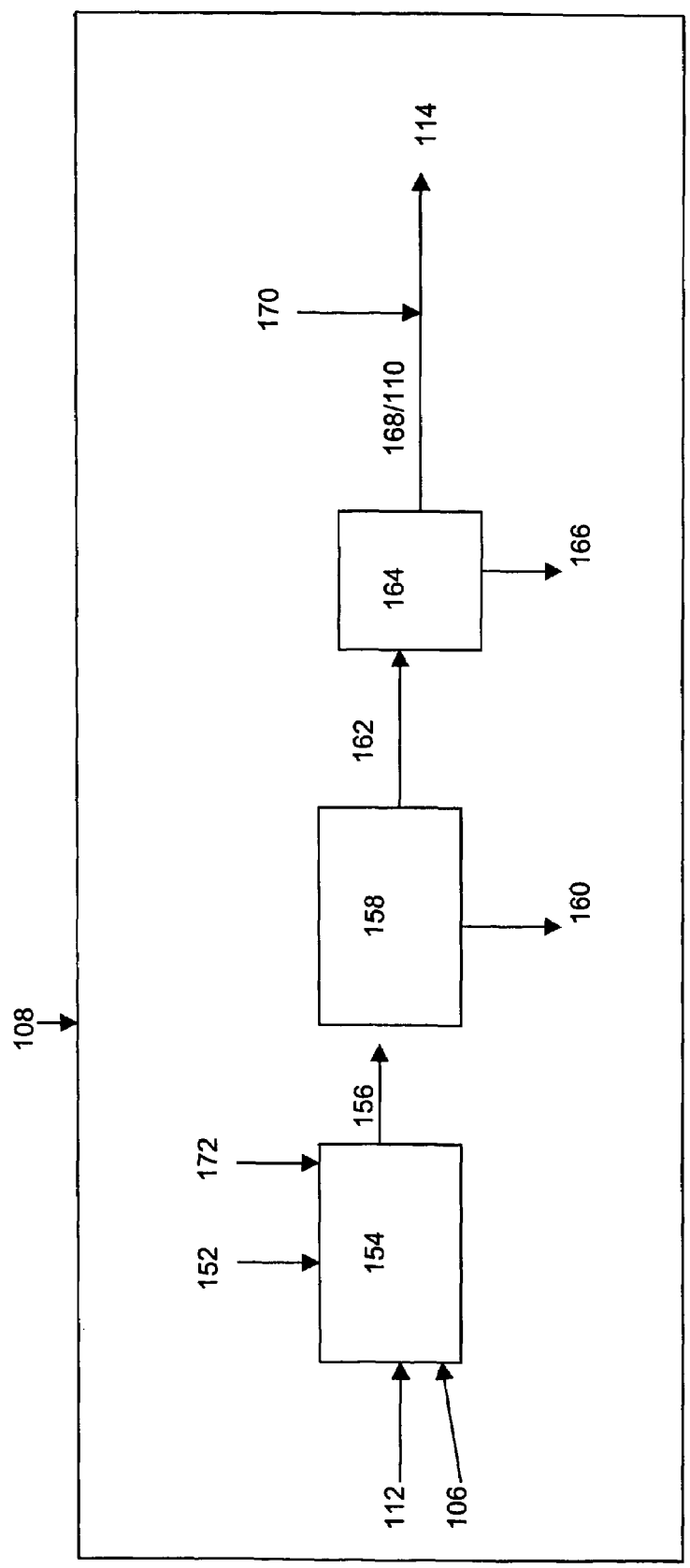

Referring to FIG. 3, the solution is preferably first treated to precipitate manganese, which is in the +2 oxidation state, preferably as manganese dioxide. Further, if the solution is acidic, some of the manganese may still be in the +2 oxidation state (e.g., if the solution is at a pH less than 1) and therefore may be treated to convert all or essentially all of the manganese to the +4 oxidation state and precipitate manganese dioxide. Preferably, the stream 112 is treated to increase the pH to greater than 4 and, more preferably, greater than 6. For example, once the permanganate in the solution is essentially consumed, stream 112 of spent absorbent solution may be fed to reactor 154 wherein stream 112 is treated as may be required to adjust the solution pH and oxidize the manganese in the +2 oxidation state to the +4 oxidation state wherein manganese dioxide will precipitate and the solution will be essentially neutralized as represented by the following generalized reaction:

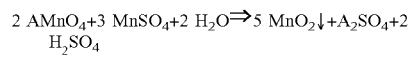

Where A=alkali metal

For example, stream 112 may be treated to oxidize the manganous ion and, if required, a neutralization agent may be combined with stream 112. The manganous ion may be oxidized to MNO$_2$ by heating the solution in air or by the addition of an oxidation agent, such as hydrogen peroxide, lead dioxide, nitric acid and permanganate. Preferably, stream 112 is treated to oxidize the manganous ion by the addition of an oxidation agent and, if required, a neutralization agent may be combined with stream 112. For example, the oxidation agent may be added by stream 152 and the neutralization agent may be added by stream 172. It will be appreciated that both agents may be added by any means known in the art. For example, they may be added in a single stream.

Oxidation agent 152 is preferably permanganate. Permanganate is preferred since it introduces no additional species into the solution that may require separate waste treatment, is safe and the appearance of the purple permanganate colour signals that all of the Mn$^{2+}$ has been oxidized. Preferably, an oxidation agent and, if required, a neutralization agent may be combined with stream 112. Further, the alkali of the permanganate salt will neutralize the acid (e.g., sulfuric acid) so that $MnO_2$ rather than $Mn^{2+}$ is the stable species.

Reactor 154 may be any vessel or container in which oxidation agent 152 may be contacted with stream 112.

Liquid solid mixture 156 may then be fed to a liquid solid separator 158 to produce a solid stream 160 comprising precipitated manganese dioxide and a liquid stream 162 comprising an aqueous stream comprising ionic mercury. Any liquid solid separation technique, such as a settling tank, a cyclone and the like may be used.

It will be appreciated that if spent stream 112 is alkaline, then no permanganate addition may be required as manganese will have already been precipitated out as manganese dioxide. If the permanganate has already been filtered out, the spent stream 112 may be used as feed stream 162. Alternately, if the permanganate dioxide has not been sufficiently removed from solution, then spent stream 112 may be fed to liquid solid separator 158.

Liquid stream 162 may then be disposed. Alternately, liquid stream 162 may be treated to concentrate the ionic mercury or to capture the ionic mercury. Any technique known in the art may be used. For example, as shown in FIG. 3, liquid stream 162 may be fed to mercury removal reactor 164 to obtain a mercury rich fraction 166 and a mercury lean stream 168. Mercury removal reactor 164 may utilize ion exchange, the addition of a precipitation agent or any other means known in the art. The precipitation agent may be any known in the art, such as a sulfide or a trimercapto-s-triazine trisodium salt. Accordingly, mercury rich fraction 166 may be a precipitate or a concentrated mercury solution or resin.

The mercury containing precipitate or resin may then be disposed of according to applicable regulations. The remaining aqueous solution 168 comprises alkali and alkali salts such as nitrates and sulfates. Solution 168 may then be disposed of if desired, preferably to a normal waste-water treatment system, or if the quality of the remaining solution is acceptable, it can be used to prepare new permanganate solution, such as by the addition of alkali metal permanganate solution 170. New permanganate solution is then fed into the process via stream 114.

It will be appreciated that various modifications and variations may be made and all of those modifications and variations are within the scope of the following claims. For example, any $SO_2$, $CO_2$ and $NO_x$ absorbent known in the art may be used. The absorbents may be recycled and, if so, they and may be recycled by any means known in the art. It will also be appreciated that alternate steps may be used to treat the spent mercury absorbent solution. It will also be appreciated that the steps may be combined in various combinations and subcombinations.

The invention claimed is:

1. A process for removing contaminants from a waste gas stream comprising:
    a) treating the waste gas stream to remove $SO_2$, $CO_2$ and $NO_x$ and to obtain a lean stream having a reduced level of $SO_2$, $CO_2$ and $NO_x$; and,
    b) contacting the lean gas stream with a mercury absorbent solution comprising permanganate to remove mercury vapor and to obtain a mercury lean stream and a mercury rich absorbent solution.

2. The process as claimed in claim 1 further comprising selecting an aqueous alkali metal or alkaline earth metal permanganate solution as the mercury absorbent solution.

3. The process as claimed in claim 1 further comprising selecting as the mercury absorbent solution a solution comprising at least one of a potassium salt of permanganate, a sodium salt of permanganate, a magnesium salt of permanganate and a calcium salt of permanganate.

4. The process as claimed in claim 1 wherein the mercury absorbent solution comprises an aqueous alkali metal permanganate solution having a pH less than about 1.

5. The process as claimed in claim 4 wherein the aqueous alkali metal permanganate solution comprises about 0.1 to 5% by weight permanganate salt.

6. The process as claimed in claim 1 further comprising treating the waste gas stream to remove $SO_2$ and to subsequently remove $NO_x$.

7. The process as claimed in claim 1 further comprising:
    a) subjecting the waste gas stream to a $SO_2$ removal step using a regenerated $SO_2$ absorbent stream and recovering a $SO_2$ lean stream and a $SO_2$ rich absorbent stream;
    b) treating the $SO_2$ rich absorbent stream to obtain the regenerated $SO_2$ absorbent stream and a first gaseous stream;
    c) subjecting the $SO_2$ lean stream to a $NO_x$ removal step using a regenerated $NO_x$ absorbent stream and recovering the lean stream and a $NO_x$ rich absorbent stream; and,
    d) treating the $NO_x$ rich absorbent stream to obtain the regenerated $NO_x$ absorbent stream and a second gaseous stream.

8. The process as claimed in claim 1 further comprising:
    a) subjecting the waste gas stream to a $SO_2$ removal step using a regenerated $SO_2$ absorbent stream and recovering a $SO_2$ lean stream and a $SO_2$ rich absorbent stream;
    b) treating the $SO_2$ rich absorbent stream to obtain the regenerated $SO_2$ absorbent stream and a first gaseous stream;
    c) subjecting the $SO_2$ lean stream to a $CO_2$ removal step using a regenerated $CO_2$ absorbent and recovering a $CO_2$ lean stream and a $CO_2$ rich absorbent stream;
    d) treating the $CO_2$ absorbent to obtain the regenerated $CO_2$ absorbent stream and a third gaseous stream;
    e) subjecting the $CO_2$ lean stream to a $NO_x$ removal step using a regenerated $NO_x$ absorbent stream and recovering the lean stream and a $NO_x$ rich absorbent stream; and,
    f) treating the $NO_x$ rich absorbent stream to obtain the regenerated $NO_x$ absorbent stream and a second gaseous stream.

9. The process as claimed in claim 1 wherein the lean stream comprises less than 100 ppm $SO_2$ and $NO_x$.

10. The process as claimed in claim 1 wherein at least some of the permanganate reacts upon exposure to mercury vapor to produce manganese dioxide and the process further comprises treating the mercury rich absorbent stream to remove precipitated manganese dioxide.

11. The process as claimed in claim 1 wherein the mercury rich absorption solution is acidic and contains $Hg^{++}$ ions and $Mn^{++}$ ions and the process further comprises treating the mercury rich absorption solution to precipitate manganese dioxide.

12. The process as claimed in claim 11 further comprising subsequently removing the dissolved $Hg^{++}$ by one or more of selective ion exchange and precipitation.

13. The process as claimed in claim 12 wherein the $Hg^{++}$ is precipitated by the addition of a precipitation agent comprising one or more of sulfide and trimercapto-s-triazine trisodium salt.

14. The process as claimed in claim 1 further comprising monitoring the concentration of permanganate in the mercury absorbent solution and adding alkali metal permanganate to maintain the concentration of permanganate in the mercury absorbent solution in the range 0.01 to 5% wt.

15. The process as claimed in claim 1 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

16. The process as claimed in claim 1 wherein the mercury rich absorption solution contains $Hg^{++}$ ions and precipitated manganese dioxide and the process further comprises separating the precipitated manganese dioxide and obtaining a liquid stream.

17. The process as claimed in claim 16 further comprising subsequently removing the dissolved $Hg^{++}$ from the liquid stream by one or more of selective ion exchange and precipitation.

18. The process as claimed in claim 17 wherein the $Hg^{++}$ is precipitated by the addition of a precipitation agent comprising one or more of sulfide and trimercapto-s-triazine trisodium salt.

19. A process for removing contaminants from a waste gas stream comprising:
   a) subjecting the waste gas stream to a $SO_2$ removal step using a regenerated $SO_2$ absorbent stream and recovering a $SO_2$ lean stream and a $SO_2$ rich absorbent stream;
   b) treating the $SO_2$ rich absorbent stream to obtain the regenerated $SO_2$ absorbent stream and a first gaseous stream;
   c) subjecting the $SO_2$ lean stream to a $NO_x$ removal step using a regenerated $NO_x$ absorbent stream and recovering a lean stream having a reduced level of $SO_2$ and $NO_x$ and a $NO_x$ rich absorbent stream;
   d) treating the $NO_x$ rich absorbent stream to obtain the regenerated $NO_x$ absorbent stream and a second gaseous stream; and,
   e) contacting the lean gas stream with a mercury absorbent solution comprising permanganate to remove mercury vapor and to obtain a mercury lean stream and a mercury rich absorbent solution.

20. The process as claimed in claim 19 further comprising selecting an aqueous alkali metal or alkaline earth metal permanganate solution as the mercury absorbent solution.

21. The process as claimed in claim 19 further comprising selecting as the mercury absorbent solution a solution comprising at least one of a potassium salt of permanganate, a sodium salt of permanganate, a magnesium salt of permanganate and a calcium salt of permanganate.

22. The process as claimed in claim 19 wherein the mercury absorbent solution comprises an aqueous alkali metal permanganate solution aqueous compringes about 0.1 to 5% by weight permanganate salt.

23. The process as claimed in claim 19 further comprising treating the $SO_2$ lean stream to a $CO_2$ removal step using a regenerated $CO_2$ absorbent prior to subjecting the $SO_2$ lean stream to a $NO_x$ removal step.

24. The process as claimed in claim 19 wherein the lean stream comprises less than 100 ppm $SO_2$ and $NO_x$.

25. The process as claimed in claim 19 wherein at least some of the permanganate reacts upon expose to mercury vapor to produce manganese dioxide and the process further comprises treating the mercury rich absorbent stream to remove precipitated manganese dioxide.

26. The process as claimed in claim 19 wherein the mercury rich absorption solution is acidic and contains $Hg_{++}$ ions and $Mn_{++}$ ions and the process further comprises treating the mercury rich absorption solution to precipitate manganese dioxide.

27. The process as claimed in claim 19 further comprising monitoring the concentration of permanganate in the mercury absorbent solution and adding alkali metal permanganate to maintain the concentration of permanganate in the mercury absorbent solution in the range 0.01 to 5% wt.

28. The process as claimed in claim 19 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

29. A process for removing contaminants from a waste gas stream comprising:
   a) subjecting the waste gas stream to a $SO_2$ removal step using a regenerated $SO_2$ absorbent stream and recovering a $SO_2$ lean stream and a $SO_2$ rich absorbent stream;
   b) treating the $SO_2$ rich absorbent stream to obtain the regenerated $SO_2$ absorbent stream and a first gaseous stream;
   c) subjecting the $SO_2$ lean stream to a $CO_2$ removal step using a regenerated $CO_2$ absorbent and recovering a $CO_2$ lean stream and a $CO_2$ rich absorbent stream;
   d) treating the $CO_2$ absorbent to obtain the regenerated $CO_2$ absorbent stream and a third gaseous stream;
   e) subjecting the $CO_2$ lean stream to a $NO_x$ removal step using a regenerated $NO_x$ absorbent stream and recovering a lean stream having a reduced level of $SO_2$, $CO_2$ and $NO_x$ and a $NO_x$ rich absorbent stream; and,
   treating the $NO_x$ rich absorbent stream to obtain the regenerated $NO_x$ absorbent stream and a second gaseous stream; and,
   f) contacting the lean gas stream with a mercury absorbent solution comprising permanganate to remove mercury vapor and to obtain a mercury lean stream and a mercury rich absorbent solution.

30. The process as claimed in claim 29 further comprising selecting an aqueous alkali metal or alkaline earth metal permanganate solution as the mercury absorbent solution.

31. The process as claimed in claim 29 further comprising selecting as the mercury absorbent solution a solution comprising at least one of a potassium salt of permanganate, a sodium salt of permanganate, a magnesium salt of permanganate and a calcium salt of permanganate.

32. The process as claimed in claim 29 wherein the mercury absorbent solution comprises an aqueous alkali metal permanganate solution comprising about 0.1 to 5% by weight permanganate salt.

33. The process as claimed in claim 29 further comprising treating the $SO_2$ lean stream to a $CO_2$ removal step using a regenerated $CO_2$ absorbent prior to subjecting the $SO_2$ lean stream to a $NO_x$ removal step.

34. The process as claimed in claim 29 wherein the lean stream comprises less than 100ppm $SO_2$ and $NO_x$.

35. The process as claimed in claim 29 wherein at least some of the permanganate reacts upon expose to mercury vapor to produce manganese dioxide and the process further comprises treating the mercury rich absorbent stream to remove precipitated manganese dioxide.

36. The process as claimed in claim 29 wherein the mercury rich absorption solution is acidic and contains $Hg^{++}$ ions and $Mn^{++}$ ions and the process further comprises treating the mercury rich absorption solution to precipitate manganese dioxide.

37. The process as claimed in claim 29 further comprising monitoring the concentration of permanganate in the mercury absorbent solution and adding alkali metal permanganate to maintain the concentration of permanganate in the mercury absorbent solution in the range 0.01 to 5% wt.

38. The process as claimed in claim 29 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

39. A process for removing contaminants from a waste gas stream comprising:
   a) treating the waste gas stream to remove at least one of $SO_2$ and $NO_x$ and to obtain a lean stream having a reduced level of at least one of $SO_2$ and $NO_x$; p1 b) contacting the lean gas stream with a mercury absorbent solution comprising permangenate to remove mercury vapor and to obtain a mercury lean stream and a mercury rich absorbent solution that is acidic and contains $Hg^{++}$ ions and $Mn^{++}$ ions;
   c) treating the mercury rich absorption solution to precipitate manganese dioxide; and,
   d) subsequently removing the dissolved $Hg^{++}$ by one or more of selective ion exchange and precipitation.

40. The process as claimed in claim 39 further comprising selecting an aqueous alkali metal or alkaline earth metal permanganate solution as the mercury absorbent solution.

41. The process as claimed in claim 39 further comprising selecting as the mercury absorbent solution a solution comprising at least one of a potassium salt of permanganate, a sodium salt of permanganate, a magnesium salt of permanganate and a calcium salt of permanganate.

42. The process as claimed in claim 39 wherein the mercury absorbent solution comprises an aqueous alkali metal permanganate solution comprising about 0.1 to 5% by weight permanganate salt.

43. The process as claimed in claim 39 wherein at least some of the permanganate reacts upon expose to mercury vapor to produce manganese dioxide and the process further comprises treating the mercury rich absorbent stream to remove precipitated manganese dioxide.

44. The process as claimed in claim 39 further comprising treating the mercury rich absorption solution with permanganate to precipitate manganese dioxide.

45. The process as claimed in claim 39 further comprising monitoring the concentration of permanganate in the mercury absorbent solution and adding alkali metal permanganate to maintain the concentration of permanganate in the mercury absorbent solution in the range 0.01 to 5% wt.

46. The process as claimed in claim 39 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

47. A process for removing contaminants from a waste gas stream comprising:
   a) treating the waste gas stream to remove at least one of $SO_2$ and $NO_x$ and to obtain a lean stream having a reduced level of at least one of $SO_2$ and $NO_x$;
   b) contacting the lean gas stream with a mercury absorbent solution comprising permanganate to remove mercury vapor and to obtain a mercury lean stream and a mercury rich absorbent solution; and,
   c) monitoring the concentration of permanganate in the mercury absorbent solution and adding alkali metal permanganate to maintain the concentration of permanganate in the mercury absorbent solution in the range 0.01 to 5% wt.

48. The process as claimed in claim 47 further comprising selecting an aqueous alkali metal or alkaline earth metal permanganate solution as the mercury absorbent solution.

49. The process as claimed in claim 47 further comprising selecting as the mercury absorbent solution a solution comprising at least one of a potassium salt of permanganate, a sodium salt of permanganate, a magnesium salt of permanganate and a calcium salt of permanganate.

50. The process as claimed in claim 47 wherein the mercury absorbent solution comprises an aqueous alkali metal permanganate solution comprising about 0.1 to 5% by weight permanganate salt.

51. The process as claimed in claim 47 wherein at least some of the permanganate reacts upon expose to mercury vapor to produce manganese dioxide and the process further comprises treating the mercury rich absorbent stream to remove precipitated manganese dioxide.

52. The process as claimed in claim 47 wherein the mercury rich absorption solution is acidic and contains $Hg^{++}$ ions and $Mn^{++}$ ions and the process further comprises treating the mercury rich absorption solution to precipitate manganese dioxide.

53. The process as claimed in claim 47 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

54. A process for removing contaminants from a waste gas stream comprising:
   a) treating the waste gas stream to remove at least one of $SO_2$ and $NO_x$ and to obtain a lean stream having a reduced level of at least one of $SO_2$ and $NO_x$; and,
   b) contacting the lean gas stream with a mercury absorbent solution comprising permanganate to remove mercury vapor and to obtain a mercury lean stream and a mercury rich absorbent solution,
   wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

55. The process as claimed in claim 54 further comprising selecting an aqueous alkali metal or alkaline earth metal permanganate solution as the mercury absorbent solution.

56. The process as claimed in claim 54 further comprising selecting as the mercury absorbent solution a solution comprising at least one of a potassium salt of permanganate, a sodium salt of permanganate, a magnesium salt of permanganate and a calcium salt of permanganate.

57. The process as claimed in claim 54 wherein the mercury absorbent solution comprises an aqueous alkali metal permanganate solution compriseing about 0.1 to 5% by weight permanganate salt.

58. The process as claimed in claim 54 wherein at least some of the permanganate reacts upon expose to mercury vapor to produce manganese dioxide and the process further comprises treating the mercury rich absorbent stream to remove precipitated manganese dioxide.

59. The process as claimed in claim 54 wherein the mercury rich absorption solution is acidic and contains $Hg^{++}$ ions and Mn$^{++}$ ions and the process further comprises treating the mercury rich absorption solution to precipitate manganese dioxide.

60. The process as claimed in claim 54 further comprising monitoring the concentration of permanganate in the mercury absorbent solution and adding alkali metal permanganate to maintain the concentration of permanganate in the mercury absorbent solution in the range 0.01 to 5% wt.

61. A process for removing contaminants from a waste gas stream comprising:
   a) treating the waste gas stream to remove at least one of $SO_2$ and $NO_x$ and to obtain a lean stream having a reduced level of at least one of $SO_2$ and $NO_x$;
   b) contacting the lean gas stream with a mercury absorbent solution comprising permanganate to remove mercury vapor and to obtain a mercury lean stream and a mercury rich absorbent solution that contains Hg$^{++}$ ions and precipitated manganese dioxide;
   c) separating the precipitated manganese dioxide and obtaining a liquid stream; and,
   d) subsequently removing the dissolved Hg$^{++}$ from the liquid stream by one or more of selective ion exchange and precipitation.

62. The process as claimed in claim 61 wherein the Hg$^{++}$ is precipitated by the addition of a precipitation agent comprising one or more of sulfide and trimercapto-s-triazine trisodium salt.

63. The process as claimed in claim 61 further comprising selecting an aqueous alkali metal or alkaline earth metal permanganate solution as the mercury absorbent solution.

64. The process as claimed in claim 61 further comprising selecting as the mercury absorbent solution a solution comprising at least one of a potassium salt of permanganate, a sodium salt of permanganate, a magnesium salt of permanganate and a calcium salt of permanganate.

65. The process as claimed in claim 61 further comprising monitoring the concentration of permanganate in the mercury absorbent solution and adding alkali metal permanganate to maintain the concentration of permanganate in the mercury absorbent solution in the range 0.01 to 5% wt.

66. The process as claimed in claim 61 wherein the mercury rich absorbent solution is neutralized to a pH >4 and sufficient permanganate is added to oxidize manganese in the +2 oxidation state to the +4 oxidation state whereby essentially all the manganese salts precipitate as $MnO_2$.

* * * * *